March 14, 1961 F. D. WALDHAUER 2,974,891
TAPE RECORDER
Filed Nov. 1, 1955
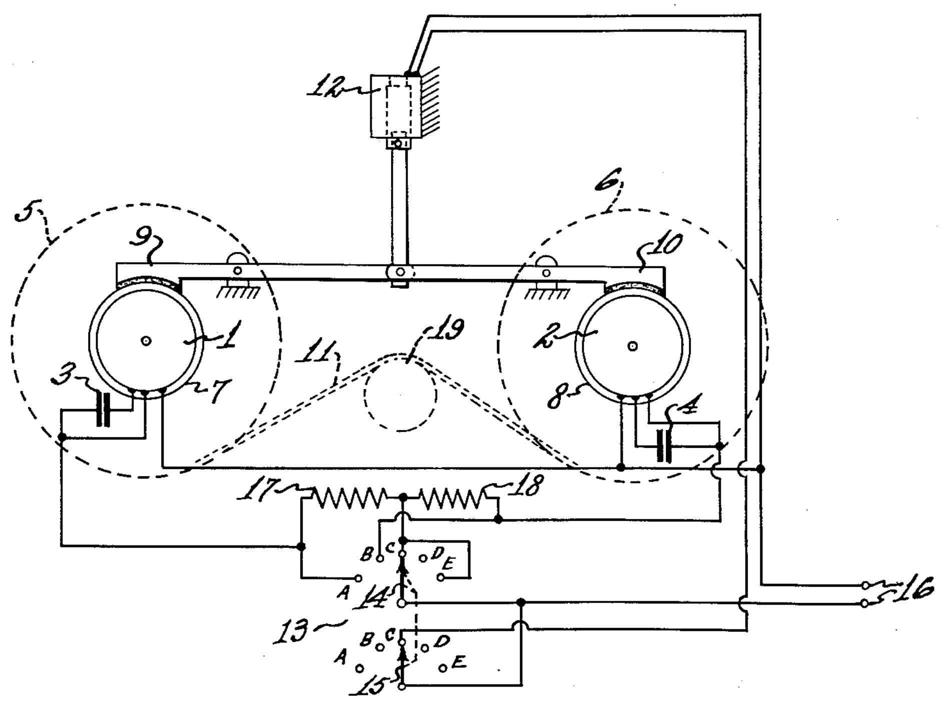
INVENTOR.
FREDERICK D. WALDHAUER
BY Morris A. Rakkin
ATTORNEY United States Patent Office 2,974,891 Patented Mar. 14, 1961

2,974,891

TAPE RECORDER

Frederick D. Waldhauer, Haddonfield, N.J., assignor to Radio Corporation of America, a corporation of Delaware Filed Nov. 1, 1955, Ser. No. 544,105

5 Claims. (Cl. 242—55.12)

This invention relates to tape recorders and the like, and it has for its object to provide a novel and improved precision braking system for such devices.

Another object of the invention is to provide a simple and efficient combination electrical and mechanical braking system for tape recorders of the type in which separate reel-driving motors are utilized to tension the tape.

Still another object is to provide a system of the type specified in which a substantially equal mechanical braking force is simultaneously applied to the two reels, and at the same time the two reel motors are energized slightly in a take-up direction, thus achieving the desired braking effect without resort to the regenerative and degenerative braking action which has posed many problems in the past.

Various other objects and advantages will be apparent as the nature of the invention is more fully disclosed.

Many different braking systems have been proposed for stopping the record tape, film or wire of sound recorders after a high speed rewind or fast forward operation. A major difficulty to be overcome is the loss of tape tension if the reel which is receiving the tape stops more quickly than the reel which is paying out the tape. When this happens, it results in the "throwing of a tape loop" with attendant loss of control and possible breakage of the tape.

Attempts have been made to solve this problem by using a system of regeneration and degeneration in the brakes applied to the reel shafts. That is, the brakes are arranged so that the supply or pay-out reel receives more braking effect than the take-up or receiving reel, regardless of the direction of motion of the tape. Each reel is provided with a brake which is regenerative when the reel is paying out tape, and is degenerative when the reel is receiving tape. Thus, if such a system worked properly, tape tension would always be maintained, and the tape would be kept under control.

However, considerable difficulty has been experienced in the manufacture of brakes of the aforementioned type in controlling the amount of regeneration applied to the pay-out reel brakes. A very careful balancing of forces is required to make the system operate satisfactorily. In order to achieve the necessary braking effect, the regeneration must be controlled and is very critical. If the amount of regeneration is even slightly too great, there is a danger that the brake will "grab" with the likelihood of tape breakage.

Brakes of the above-mentioned prior art type are also difficult to maintain in the field. They are apparently subject to humidity conditions and to any slight variation in the coefficient of friction of the braking surfaces, such as may be caused, for example, by inadvertent lubrication of the brakes. It is therefore highly desirable to avoid the use of brakes which require a high degree of regeneration.

The present invention provides an improved braking system which avoids the foregoing disadvantages of the prior art by eliminating the need for regenerative brakes while still insuring complete control of the tape at all times. The invention, as hereinafter described, is applied to a recorder which has a separate reel driving motor for each of the two driving reels. A substantially equal mechanical braking force is applied simultaneously to the two reels. At the same time, the two reel motors are energized slightly in a direction which tends to cause the two reels to take up tape. This causes the net braking effort on the pay-out reel to be greater than the net braking effort on the take-up reel, thus achieving the desired result.

In accordance with the invention, therefore, while the mechanical braking effect is approximately the same for each reel, tape control is exercised by adding braking effort to the pay-out reel and subtracting braking effort from the take-up reel by utilizing the tape tensioning means normally employed in the playback of the tape. In a recorder having two reel motors which provide tape tension when they are energized, for example, a predetermined current is supplied to each of said motors at the same time that the mechanical braking action is applied. This energization of the motors tends to pull the tape back onto the pay-out reel, thereby adding effectively to the braking effort of this reel, while it will simultaneously tend to urge the take-up reel in the direction in which it has been going, thereby reducing the braking effort of the take-up reel.

The terms pay-out reel and take-up reel are used herein to designate the named functions regardless of the direction of motion of the tape. Thus, whether the tape is moving fast forward or fast reverse or rewind, the reel which is receiving tape is termed the take-up reel, while the other one is termed the pay-out reel.

The invention is described more in detail in conjunction with the accompanying single-sheet drawing which is a plan view of the underneath side of a tape recorder reel drive system embodying the invention, with the electrical connections shown in schematic form.

In the drawing, a pair of reel motors 1 and 2 are illustratively shown as split phase induction motors provided with individual starting capacitors 3 and 4. The motors 1 and 2 are individually connected to drive tape reels 5 and 6 shown in dotted outline. Mechanical friction brakes are provided for reels 5 and 6 and comprise brake drums 7 and 8 cooperating with brake shoes 9 and 10, respectively. The recording medium indicated as a tape 11 winds and unwinds between the reels 5 and 6 in the usual manner. The brake shoes 9 and 10 may be simultaneously actuated to stop the reels 5 and 6 by the energization of a solenoid 12 mechanically linked to both brake shoes in any suitable manner.

The control mechanism includes a two-pole five position switch 13 having five pairs of upper and lower contacts A, B, C, D, and E, and upper and lower switch arms 14 and 15 which are insulated from and secured to a common rotatable operating shaft, not shown.

In the "brake" position C of switch 13, the solenoid 12 is energized from any suitable source of current, such as the 117 volt line illustrated as a pair of terminals 16. In this position of the switch, the reel motors 1 and 2 are also energized through resistors 17 and 18, respectively, to provide tape tension during the braking operation.

In the switching arrangement illustrated herein, position A of switch 13 connects motor 1 directly to the line terminals 16 through switch arm 14 to provide "fast forward" operation, while motor 2 is connected to said line terminals through said switch arm 14 and the series combination of resistors 17 and 18 to provide a relatively small amount of tape tension.

In position B of switch 13, however, it is the motor 2 which is connected directly to the line terminals 16 to provide "fast rewind," while motor 1 is connected to said line terminals through resistors 17 and 18 in series and thus provides a small amount of tape tension.

In switch position C, as previously mentioned, braking is provided by the mechanical brakes 9 and 10, while tape tension is additionally provided by the aforementioned connection of motors 1 and 2 to the line terminals 16 through resistors 17 and 18, respectively.

Switch position D is an idle position in which no current is supplied to either motor. This position is used for threading the tape. Position E is the normal "play" or "record" position in which the usual constant-speed capstan drive system indicated diagrammatiaclly at 19 drives the tape, and the reel motors 1 and 2 are energized through the resistors 17 and 18, respectively, to provide tape tension.

It will be evident from the above that this system achieves the desired braking effect in a simple and efficient manner without resort to regenerative or degenerative braking action.

What is claimed is:

1. In a tape recorder having a pair of reels and a tape recording medium carried by said reels and reelable therebetween, the combination comprising controllable driving means connected with each of said reels for selectively driving said reels to take up said tape, controllable braking means associated with both of said reels operable for stopping all operation of said reels, and selectively operable control means connected to said driving means and to said braking means for operating said driving means to simultaneously drive both of said reels to take up said tape, thereby maintaining tension in said tape, and for concurrently operating said braking means to stop simultaneously all operation of both of said reels while tension is maintained in said tape whereby any inequality between said reels in the braking action of said braking means will not cause slackening of said tape.

2. Recording apparatus of the class described having a pair of reels and a recording medium in tape form carried by said reels and disposed to be taken up by either reel and paid out by the other, a reeling system comprising an individual drive motor connected to each reel for driving its associated reel to take up said tape, electromechanical braking means connected with both reels for simultaneously stopping all operation thereof when energized, and switching means connected to both of said motors and to said braking means for energizing both of said driving motors to take up said tape on each of said reels and simultaneously energizing said braking means, whereby tension is maintained in said tape during operation of said braking means and any inequality between said reels in the action of said braking means will not cause slackening of said tape.

3. In recording apparatus of the class described having a pair of reels, a recording medium in tape from carried by said reels and disposed to be taken up by either reel and paid out by the other, and an individual drive motor connected to each reel for driving its associated reel to take up said tape, the combination comprising electrically actuated mechanical braking means associated with both reels for simultaneously stopping all operation thereof, said braking means having a first operating condition when applied for simultaneously stopping said reels and having a second operating condition when released, an individual resistor connected in series with each motor, an energizing circuit for said motors and said braking means, said braking means being actuable into one of said first or said second operating conditions thereof when connected to said energizing circuit and switching means selectively operable to establish any one of a plurality of circuit conditions, said switching means in a first one of said conditions connecting one of said drive motors directly to said energizing circuit for operation at full voltage and the other drive motor to said energizing circuit through said series resistors with said braking means in said second operating condition thereof, said switching means in a second one of said conditions connecting said other drive motor directly to said energizing circuit and said one drive motor to said energizing circuit through said series resistors with said braking means in said second operating condition thereof, and said switching means in a third one of said conditions connecting both of said drive motors simultaneously to said energizing circuit each through its own series resistor and with said braking means in said first operating condition thereof for stopping operation of said reels.

4. Recording apparatus according to claim 3, further comprising constant speed capstan means for driving said tape between said reels during operation of said recording apparatus, said switching means being further operable to establish a fourth circuit condition during operation of said switching means, said braking means being in said second operating condition thereof in said fourth circuit condition and both of said drive motors being then connected to said energizing circuit, each through its own series resistor.

5. Recording apparatus according to claim 3, wherein said switching means is a five-position switch, each of said four circuit conditions being established by said switch in a different one of four of said five positions, the fifth position of said switch disconnecting both of said drive motors from said energizing circuit, said braking means being connected in said second operating condition thereof for permitting free movement of said reels while threading said tape through said recording apparatus.

References Cited in the file of this patent

UNITED STATES PATENTS

| | | |
|---|---|---|
| 1,931,107 | Dowell et al. | Oct. 17, 1933 |
| 2,071,192 | Younts | Feb. 16, 1937 |
| 2,412,551 | Pratt et al. | Dec. 10, 1946 |
| 2,419,476 | Begun | Apr. 22, 1947 |
| 2,626,760 | Chick | Jan. 27, 1953 |
| 2,666,593 | Stone | Jan. 19, 1954 |